3,011,929
MINERAL FIBER PRODUCT
Joseph P. Stalego, Newark, Ohio, assignor to Owens-Corning Fiberglas Corporation, a corporation of Delaware
No Drawing. Filed Dec. 11, 1958, Ser. No. 779,572
7 Claims. (Cl. 154—44)

This invention relates to a mineral fiber product, and to a method for producing same, and, more particularly, to a wool-like or board-like product composed of a mass of glass or other vitreous fibers, intermeshed with one another and bonded together at points of contact, and, associated therewith, a material which is effective to maintain the product substantially neutral in service.

Various products have heretofore been produced from glass and other vitreous fibers. In general, such products are made by drawing streams of a molten, vitreous material from a supply, attenuating the streams by means of a blast of a compressible or other fluid or by means of pulling wheels of one sort or another, and collecting the attenuated fibers. A wool-like product can be made by projecting the attenuated fibers through a body of a compressible fluid, associating a suitable binder, usually a phenol-formaldehyde partial condensation product, with the fibers as they are being projected through the compressible fluid, and collecting projected fibers and associated binder on a suitable conveyor, which is usually foraminous in nature. The collected fibers on the conveyor are in a wool-like mass of a thickness which depends upon the rate of travel of the conveyor relative to the rate of decomposition of fibers thereon, and the binder is associated with the fibers, and distributed throughout the wool-like mass. This mass can be heated to convert the binder to a cured, infusible condition. When the wool-like mass is compressed during such heating, a relatively high density, board-like product results, the apparent density thereof depending upon the degree of compression during heating. When the wool-like mass is merely advanced through a suitable curing oven, without compression, a glass wool or mineral wool is produced.

Glass and mineral wools, and similar higher density board products of the type discussed in the preceding paragraph, have excellent acoustical and thermal insulating properties, and have found widespread use where these characteristics are important. It has been found, however, that such products become alkaline in service, particularly in service under humid conditions. This characteristic is attributed to the leaching, from the glass or other vitreous fibers, of sodium oxide and other alkaline fluxes, and has militated against the use of glass and other vitreous fibers for thermal and acoustical insulation or as cushioning material under service conditions where corrosion is a severe problem. In fact, Military Specification C–7769, dated August 24, 1951, describes an accelerated test for determining the tendency of glass and other vitreous fibers to become alkaline under service conditions. In general, this test, which will subsequently be described in more detail, involves boiling a weighed sample of a glass or other vitreous fiber product in water, and determining both the pH and the free acidity, if any, of the water. So far as is known, prior to the instant invention, no glass or other vitreous fiber article which would pass this test had ever been produced.

The instant invention is based upon the discovery of a product composed of vitreous fibers, which product is capable of passing the boiling water test set forth by Military Specification C–7769. In general, such product can be wool-like, or board-like, and can have an apparent density ranging from about 1 lb. per cubic foot or even lower to about 12 lbs. per cubic foot or even higher, and, in the case of a board-like product, can have any desired shape. Such product comprises glass or other vitreous fibers intermeshed with one another and locked together at points of contact by a suitable binder, which is usually a phenolic resite produced by curing a resole composition, and includes a pH control medium which is, preferably, slightly acid reacting, and is effective throughout an extended service life to neutralize alkali leached from the fibers, and at substantially the same rate that alkali is released. Excellent results have been achieved when the pH control medium has been a slightly water-soluble, acid reacting, alkyd resin with zinc acetate dispersed therein.

It is, therefore, an object of the invention to provide an improved vitreous fiber product.

It is a further object to provide a vitreous fiber product which remains substantially neutral in service.

It is still another object of the invention to provide a method for producing an improved vitreous fiber product.

Other objects and advantages will be apparent from the description which follows, which is intended only to illustrate and disclose, and in no way to constitute a limitation upon, the invention.

The following example, wherein, as elsewhere herein, and in the appended claims, the terms "percent" and "parts" are used to refer to percent and parts by weight, unless otherwise indicated, describes the production of a specific product according to the invention, and constitutes the best presently known mode for practicing the invention.

*Example*

A treating material constituting a pH control medium was prepared by charging a mixing tank with approximately 50 gallons of water and 10.8 gallons of Alkyd Resin A,[1] adding ammonium hydroxide to the resulting solution to bring the pH thereof to approximately 5.6 and then adding 122 lbs. of zinc acetate, 12.6 lbs. of ammonium sulfate, 6.6 gallons of Oil Emulsion A,[2] and sufficient additional water to provide a total of 100 gallons.

The treating material prepared as described in the preceding paragraph was then applied to glass fibers being produced generally by the method disclosed in Slayter et al. Patent No. 2,609,566. According to this method, a stream of molten glass was flowed from an appropriate melting tank, through an orifice in a noble metal insert in the bottom of the tank, which insert is usually called a "bushing," into a rapidly rotating centrifuge having a plurality of orifices around its periphery, so that streams thereof were thrown through the orifices and into an annular blast of steam or of another gas which caused acceleration of the glass and attention of the molten streams to a desired fiber diameter. The fibers were projected by the blast into a forming hood where they were collected on a foraminous conveyor in the form of a wool-like mass. A phenolic binder composition, which will subsequently be identified in detail, was sprayed onto the fibers while they were being projected through the air within the forming hood, and the treating material produced as described in the preceding paragraph was sprayed onto the fibers above the blowers, or just outside the orifices in the centrifuge. The phenolic binder, on a dry solids basis, was used in the proportion of 8 parts per 100 parts of the fibers. The treating material or pH control

[1] Alkyd Resin A is prepared by mixing 20.8 parts of maleic acid with 4.7 parts of ethylene glycol, 24 parts of pentaerythritol and 1.26 parts of boric acid in a glass reaction vessel, adding a sufficient amount of water to obtain a slurry, flushing air from the reaction vessel with nitrogen, and heating the mixture in the vessel to 150° C. and maintaining it at approximately such temperature until the acid number thereof is substantially 40. Water is then mixed with the reaction products to provide a 15 percent solids material.

[2] Oil Emulsion A is prepared by emulsifying 90 parts of mineral oil with 100 parts of water, using, as surfactants for the emulsification, 7 parts of an isooctyl phenyl polyethoxy ethanol and 3 parts of an oil cut, synthetic petroleum sulfonate having a molecular weight of approximately 50.

medium was applied to the fibers at a rate of 5 parts of the treating material per 100 parts of fibers, so that the treating material applied, on a dry solids basis, constituted, per 100 parts of fibers, 2.4 parts of zinc acetate, ¼ part of ammonium sulfate, 1.85 parts of Alkyd Resin A, and ½ part of Oil Emulsion A. The wool-like mass of fibers and associated binder and treating material was advanced by the foraminous conveyor into and through a curing oven. The oven temperature was approximately 400° F. The residence time of the fibers within the oven was approximately ten minutes. A phenolic bonded glasswool carrying a pH control medium was discharged from the curing oven.

The glass wool produced as described above was tested in accordance with Military Specification C–7769, and was found to be within tolerances in all respects, including hydrogen ion concentration[3] and acid content.[4] The pH reading of the hydrogen ion concentration test was 6.8, and the acid content was .008.

The procedure described above has also been carried out using a lower rate of application of the treating material or pH control medium. For example, when the treating material was applied, on a dry solids basis, at the rate of 4 lbs. thereof per 100 lbs. of fibers, the pH reading from the hydrogen ion concentration test varied from 7.2 to 7.7 on different samples taken during the course of a two hour test, and the acid content was .004.

When, for purposes of comparison, but not in accordance with the invention, the procedure described above was repeated except that no treating material or pH control medium was applied to the fibers, the pH reading from the hydrogen ion concentration test was 9.2, which will be seen to be completely outside of the limits of the said Military Specification.

The phenolic binder composition to which reference is made in the foregoing example was prepared by charging a mixing tank provided with a propeller-type agitator with 1459 lbs. of Phenolic Resin A,[5] 31.2 lbs. of a pinewood pitch extract,[6] 143 lbs. of Oil Emulsion A, 13 lbs. of ammonium sulfate, 1.6 lbs. of gamma amino propyl triethoxy silane and 67.5 lbs. of ammonium hydroxide. The water and subsequently charged ingredients were stirred by the agitator throughout the charging operation, and for an additional five minutes after completion thereof to assure substantial uniformity of the completed binder composition.

The glass melt from which fibers were drawn and processed as described in the foregoing example was effected in a conventional way from batch ingredients containing the following listed ingredients in the indicated proportions.

| | Parts by weight |
|---|---|
| $SiO_2$ | 59.43 |
| $Al_2O_3$ | 32.10 |
| $CaO$ | 18.23 |
| $MgO$ | 3.96 |
| $B_2O_3$ | 10.44 |
| $Na_2O$ | 14.54 |
| $Fe_2O_3$ | 0.15 |
| $K_2O$ | 0.04 |

It will be appreciated that the mechanism by which a pH control medium is effective in accordance with the invention can be described generally as one of neutralization. However, the precise mechanism by which such neutralization occurs is not understood. It is known that a surface layer of water is adsorbed on glass fibers, and it is believed that alkali which is leached from glass fibers in service is dissolved in such adsorbed layer of water. It is probable that, in service, the pH control medium described in the foregoing example is also dissolved in the adsorbed water layer, but it has not been determined whether neutralization occurs as an ionic phenomenon in the adsorbed layer of water or as an ion exchange phenomenon on the glass surface. If the mechanism involves

---

[3] The hydrogen ion concentration test is described in the said Military Specification as follows: Sufficient pieces, not over ⅛ inch on any side, to run the pH determination in duplicate shall be cut from representative samples. Place 5 grams of air-dry cut material in a 500-ml. Pyrex Erlenmeyer flask and add 350 ml. of boiling, distilled water having a pH of 6.7 to 7.1 when free of carbon dioxide. To avoid the tendency of the material to float on the surface, the water should be added gradually, and the flask should be well shaken. After the water is added, affix to the flask a tin-foil-covered rubber stopper through which a Pyrex glass tube about 30 inches in length has been inserted to serve as a condenser. Place the flask in a heating bath which will maintain the contents of the flask at 98° C to 100° C. Heat at this temperature for 1 hour with shaking at approximately 5-minute intervals. Cool the solution rapidly and determine the pH of the unfiltered extract electrometrically, using a glass or quinhydrone electrode and calomel cell. The average of two separate tests shall be determined. If the average does not fall within the range specified, the lot represented by the samples shall be rejected.

[4] Acid content is determined according to the said Military Specification as follows: Sufficient pieces, not over ⅛ inch on any side, to determine the moisture content of the sample and to run the acidity determination in duplicate, shall be cut from representative samples. Allow the cut pieces to come to moisture equilibrium with the atmosphere of the balance case, and at the same time weigh three 5-gram portions (to the nearest 1 mg.). Determine the moisture content of one weighed portion as follows: Place the weighed specimen along with a suitable weighing container such as a widemouth, glass-stoppered bottle in a constant temperature oven at a temperature of 100° to 105° C. for 2 hours. The oven should be equipped with means of assuring adequate temperature control and free circulation of air around the specimens and preferably equipped with means for drying the air entering the oven. At the end of 2 hours, place the specimen in the weighing container and close it, doing this, if possible without removing the specimen from the oven. Let the closed container and specimen both cool to room temperature and weigh. Repeat periodical drying and weighing of the specimen until the difference in weight between two successive weighings is not more than 0.1 percent of the weight of the specimen. Make all weighings with the cover on the container and weigh to within 0.05 percent of the total weight of the original specimen. Transfer the other weighed portion to a 500-ml. Pyrex Erlenmeyer flask and extract the material for 1 hour (as described in the preceding footnote). At the end of this period, pour the contents of the flask on a Büchner funnel (without filtering medium) and wash the material remaining in the flask into the Büchner funnel with 10 ml. of distilled water having a pH of 6.7 to 7.1 when free of carbon dioxide. Apply strong suction to the material, then cool the extract rapidly and titrate as soon as it reaches room temperature. Add phenolphthalein indicator and if the extract remains colorless, determine the acidity by titrating with 0.01 N NaOH until the first appearance of permanent pink coloration. (If the extract is colored from the material, titrate to a pH of 8.3, the endpoint for phenolphthalein, using a pH meter and glass electrode.) Make a blank titration on 360 ml. of distilled water having a pH of 6.7 to 7.1 when free of carbon dioxide heated for 1 hour in the same bath and with the same glassware used for the extraction. Total acidity shall be expressed as a percentage of moisture-free material in terms of sulphuric anhydride ($SO_3$) calculated as follows:

$$\text{Percent } SO_3 = \frac{(T-t) \times N \times 0.04 \times 100}{W}$$

T = ml NaOH required to neutralize the extract,
t = ml NaOH required to neutralize the blank,
N = normality of NaOH solution, and
W = weight of test specimen less moisture.

The average of two separate tests shall be determined. If the average is more than 0.05 percent equivalent sulfur trioxide, the lot represented by the samples shall be rejected.

[5] Phenolic Resin A was produced from 66.6 parts of formaldehyde, added as 37 percent formalin, 100 parts of phenol and 4 parts of sodium hydroxide. The starting materials were mixed in a suitable vessel, allowed to stand at room temperature (about 25° C.) for approximately 16 hours, and heated at a progressively increasing temperature which was sufficient to maintain gentle boiling thereof. Heating was discontinued when the temperature of the reaction mixture reached approximately 85° C. The sodium hydroxide in the reaction mixture was then neutralized with phosphoric acid, and the neutralized resin was filtered. The filtered resin was then subjected to a vacuum distillation to remove water to a solids content of 60 percent.

[6] The extract used was in the form of an aqueous emulsion, 40 percent solids, of the resinous material, which can be isolated as described in U.S. Patent 2,391,368 (page 2, column 1, lines 34 and following). It had the following analysis:

6% high melting furfural condensate (methanol insoluble).
4% neutral oils (hydrocarbons, esters and ethers).
9% rosin.
5% belro-phenol-lactone (probably $C_{18}H_{14}O_3.2(OCH_3OH)$).
5% flavone type polyphenol (possibly about $C_{15}H_7O_2.3OH$).
2% fumic acid type compound.
0.2% pectic acid type compound.
6% air oxidized rosin acid (unfused).
3% strongly acidic compound.
38% weakly acidic, high melting phenolic compound.
19% relatively neutral phenol ethers and esters.
1% water soluble carbohydrates, etc.

a surface phenomenon, such phenomenon could be either a base exchange where zinc or equivalent cations actually replace alkali ions in the glass surface, or merely a precipitation on the surface. In any event, it has been determined that the characteristics of zinc acetate, which is the principally effective constituent of the previously described pH control medium, which make it effective are the nature of zinc cations as ones which form a weak hydroxide, and the nature of acetate anions as anions of a comparatively weak acid. It will be appreciated, therefore, that various salts other than zinc acetate can also be employed, and are equivalents therefor. For example, zinc salts of organic acids having dissociation constants not greater than $10^{-3}$ can be used, preferably, zinc salts of lower fatty acids having from 1 to 10 carbon atoms [7] can be used, as well as zinc salts of dibasic acids having from 2 through 8 carbon atoms,[8] and zinc salts of maleic and fumaric acids, Similarly, salts of metals forming weak hydroxides (i.e., hydroxides which have a pH not higher than 10.5 when dissolved in water) with any of the above identified acids can also be employed. For example, such salts of aluminum, copper, iron, calcium, magnesium, nickel, cesium, strontium, lead manganese, tin(ous), beryllium, bismuth, gallium, tellurium, thallium, cadmium, thorium, cerium, zirconium, and mercury are all suitable pH control agents.

Ammonium sulfate in the formulation set forth above also acts as a pH control agent, but to only a comparatively slight extent, and is preferably, but not necessarily, employed in a pH control medium according to the invention. The principal function of the ammonium sulfate is to increase somewhat the acidity of Alkyd Resin A or other equivalent carrier for the zinc acetate or the like. This function is performed by ammonium sulfate by volatilization of the ammonium ion during curing, for example as described above. It will be appreciated that other salts composed of a cation which is volatile under desired curing conditions, and an anion which is not volatile under such conditions can be used in place of the ammonium sulfate. When used, ammonium sulfate or an equivalent acidifying material should be present, on the fibers, to the extent of at least about ⅓ percent, but ordinarily is not employed to the extent of more than about 2 percent.

Oil Emulsion A, or an equivalent, is used in a composition according ot the invention principally for the purposes of facilitating the application of the treating material or pH control medium to the vitreous fibers and of improving the hand or feel of the ultimate product. Such a material has no effect upon pH control, and is, therefore, used only incidentally; when used, it should be present to the extent of from about ¼ percent to about 1 percent on the finished vitreous fiber product.

Alkyd Resin A is an important constituent of the composition described in the foregoing example, not by virtue of its specific identity, but, rather, because of its properties, the most important of which is its solubility in aqueous alkali but substantial insolubility in water at a pH of about 7 or lower. Alkyd Resin A is also slightly acidic in nature, having a pH of approximately 3 in the dispersion form described above. To a limited extent, therefore, this resin serves to neutralize alkali leached from glass or other vitreous fibers in service, but its principal function is to serve as a carrier, or to release zinc acetate or its equivalent, or zinc acetate or its equivalent plus the residue from ammonium sulfate or its equivalent, at a rate sufficient to neutralize leached alkali and to maintain the product substantially neutral, i.e., at a pH from about 6 to about 8.

The pH control medium in a product according to the invention is present in the form of a plurality of bodily separate masses, each of which is adhered to at least one of the fibers, but the amount thereof required to maintain substantial neutrality must be dissolved, usually in the adsorbed layer of water on the fibers in actual service, but in the boiling water in the previously described test of Military Specification C-7769. It will be appreciated that the rate at which the pH control medium is made available for neutralization of alkalinity depends upon the rate of dissolution thereof, per unit of surface area exposed to the dissolving action of water under the conditions to which the material is subjected, and also upon the number of units of area subjected to the dissolving action of water. For any given pH control medium the rate of dissolution is determined by the identity thereof, but the rate at which alkali is neutralized can be changed by changing the proportion of the pH control medium relative to the glass or other fibers. Optimum results have been achieved when the pH control medium includes a carrier soluble in alkaline water but carriers which are merely slowly soluble in water can also be used, provided that they are appropriately proportioned, as discussed above.

The rate at which a pH control medium is required to maintain a glass or other vitreous fiber product essentially neutral depends upon the chemical composition of the fibers in the product. An extreme example of the effect of glass composition upon the rate at which alkali is leached therefrom will be appreciated from a consideration of the nature of fibers produced from ordinary soda lime or bottle glass, which has high temperature viscosity characteristics and a maximum devitrification temperature which suit it, from a mechanical standpoint, for the production of fibers. Alkali leaches, however, from fibers produced therefrom at an extremely high rate, and, after a comparatively short period of time in service, the fibers disintegrate as a consequence of the alkali leaching. To maintain substantially neutral a glass wool product, for example, made from soda lime glass, a comparatively large amount of a pH control medium would be required. The rate at which alkali is leached even from commercially available glass and other vitreous fibers varies several fold, depending upon the specific composition thereof, so that the minimum amount of the specific previously identified pH control medium required in a specific vitreous fiber product, to effect pH control, varies considerably. It has been found that at least 3 percent, based upon the total weight of the article, of the identified pH control medium should be employed in most instances, and that it is usually economically unsound to use more than about 10 percent thereof because the use of a smaller proportion and fibers of a different composition which are maintained substantially neutral by such lesser proportion is more advantageous. When a pH control medium other than that specifically identified above is employed in accordance with the invention, the amount used is preferably equivalent, with respect to the neutralization of leached alkali, to the identified pH control medium when used to the extent of at least about 3 percent but not more than about 10 percent. Most desirably, zinc acetate or an equivalent is used to the extent of from about 1½ percent to about 5 percent, based upon the total weight of the article.

It will be apparent from the foregoing detailed discussion that the specific identity of Alkyd Resin A is not critical in a vitreous fiber article according to the invention, as any of numerous other materials which are equivalent, particularly with respect to water solubility and to the ability to act as a solvent or dispersant for zinc acetate or an equivalent alkali-neutralizer, can also be used. In essence, Alkyd Resin A serves principally as a carrier for the zinc actate or equivalent, and for the ammonium sulfate or equivalent, if used, and must dissolve at a rate sufficient to release the neutralizing material or materials, as required. Since the rate at which neutralizing materials are required depends upon the composition of the glass in connection with which they

---

[7] Formic, acetic, propionic, butyric, valeric, caproic, heptanoic and caprylic acids.
[8] Oxalic, malonic, succinic, glutaric, adipic, pimelic, and suberic acids.

are used, and since the quantity of the neutralizing material or materials made available for neutralization can be varied considerably per increment of Alkyd Resin A or other carrier dissolved, considerable latitude in degree of water solubility of the carrier is available, provided that correspondingly more or less of the pH control material is contained therein when the carrier is less or more, respectively, water soluble.

In general, it can be stated that an article according to the invention comprises a mass of vitreous fibers which are bonded to one another at points of contact, and that a pH control medium is adhered to the fibers. The pH control medium comprises an alkali neutralizing material, and a carrier therefor. The carrier must be soluble in water to a sufficient extent to supply the alkali neutralizing material at at least the rate at which alkali is leached from the associated vitreous fibers. The precise rate at which the carrier is dissolved can vary within substantial limits provided that suitable variations are made in the proportion of the alkali neutralizing material distributed therein. An upper limit is imposed upon water solubility of the carrier by the requirement that pH control continue throughout a useful service life of the material. The boiling water hydrogen ion concentration test of Military Specification C–7769 is designed to be more severe than actual service conditions, so that an upper limit on water solubility of the carrier can be defined by reference to this test: at least some of the carrier should remain adhered to the fibers after the article has been subjected to the action of boiling water for a period of one hour. It will be appreciated that the instant invention provides a pH control medium adhered to fibers which are intermeshed with one another to form a mass, and which are preferably bonded to one another at points of contact. The pH control medium comprises a hardened carrier material and, dispersed therein, an alkali-neutralizing agent which is a salt of a metal which forms a hydroxide having a pH, when dissolved in water, not greater than 10.5, and an organic acid having a dissociation contact of at least $10^{-6}$, but not greater than $10^{-3}$, said carrier being soluble in water to an extent sufficient to release the neutralizing agent at a rate which is at least substantially as high as that required to neutralize alkali leached from the vitreous fibers, but insoluble to an extent such that at least an appreciable amount thereof remains after the article has been subjected to boiling water for one hour.

What I claim is:

1. In an article which is a mass of intermeshed vitreous fibers, which fibers are bonded to one another at points of contact, the improvement of a pH control medium adhered to the fibers, said pH control medium being present to the extent of from about 3 percent to about 10 percent, based upon the total weight of the article, and comprising a hardened alkyd resin carrier material and, dispersed therein, zinc acetate as an alkali-neutralizing agent, the zinc acetate being present to the extent of from about 1½ percent to about 5 percent, based upon the total weight of the article, and said carrier being soluble in water to an extent sufficient to release the neutralizing agent at a rate which is at least substantially as high as that required to neutralize alkali leached from the vitreous fibers, but insoluble to an extent such that at least an appreciable amount thereof remains after the article has been subjected to boiling water for one hour.

2. In an article which is a mass of intermeshed vitreous fibers, which fibers are bonded to one another at points of contact, the improvement of a pH control medium adhered to the fibers, said pH control medium being present to the extent of from about 3 percent to about 10 percent, based upon the total weight of the article, and comprising a hardened, borated, alkyd resin carrier material and, dispersed therein, zinc acetate as an alkali-neutralizing agent, the zinc acetate being present to the extent of from about 1½ percent to about 5 percent, based upon the total weight of the article, and said carrier being soluble in water to an extent sufficient to release the neutralizing agent at a rate which is at least substantially as high as that required to neutralize alkali leached from the vitreous fibers, but insoluble to an extent such that at least an appreciable amount thereof remains after the article has been subjected to boiling water for one hour.

3. In an article which is a mass of intermeshed vitreous fibers, which fibers are bonded to one another at points of contact, the improvement of a pH control medium adhered to the fibers, said pH control medium being present to the extent of from about 3 percent to about 10 percent, based upon the total weight of the article, and comprising a hardened alkyd resin carrier material and, dispersed therein, an alkali-neutralizing agent which is a zinc salt of a fatty acid having from 1 to 10 carbon atoms, said carrier being soluble in water to an extent sufficient to release the neutralizing agent at a rate which is at least substantially as high as that required to neutralize alkali leached from the vitreous fibers, but insoluble to an extent such that at least an appreciable amount thereof remains after the article has been subjected to boiling water for one hour.

4. In an article which is a mass of intermeshed vitreous fibers, which fibers are bonded to one another at points of contact, the improvement of a pH control medium adhered to the fibers, said pH control medium comprising a hardened alkyd resin carrier material and, dispersed therein, an alkali-neutralizing agent which is a zinc salt of a fatty acid having from 1 to 10 carbon atoms, said carrier being soluble in water to an extent sufficient to release the neutralizing agent at a rate which is at least substantially as high as that required to neutralize alkali leached from the vitreous fibers, but insoluble to an extent such that at least an appreciable amount thereof remains after the article has been subjected to boiling water for one hour.

5. In an article which is a mass of intermeshed vitreous fibers, which fibers are bonded to one another at points of contact, the improvement of a pH control medium adhered to the fibers, said pH control medium comprising a hardened alkyd resin carrier material and, dispersed therein, an alkali-neutralizing agent which is a salt of a metal which forms a hydroxide having a pH, when dissolved in water, not greater than 10.5, and a fatty acid having from 1 to 10 carbon atoms, said carrier being soluble in water to an extent sufficient to release the neutralizing agent at a rate which is at least substantially as high as that required to neutralize alkali leached from the vitreous fibers, but insoluble to an extent such that at least an appreciable amount thereof remains after the article has been subjected to boiling water for one hour.

6. In an article which is a mass of intermeshed vitreous fibers, the improvement of a pH control medium adhered to the fibers, said pH control medium comprising a hardened alkyd resin carrier material and, dispersed therein, an alkali-neutralizing agent which is a salt of a metal which forms a hydroxide having a pH, when dissolved in water, not greater than 10.5, and an organic acid having a dissociation constant not greater than $10^{-3}$, said carrier being soluble in water to an extent sufficient to release the neutralizing agent at a rate which is at least substantially as high as that required to neutralize alkali leached from the vitreous fibers, but insoluble to an extent such that at least an appreciable amount thereof remains after the article has been subjected to boiling water for one hour.

7. In an article which is a mass of intermeshed vitreous fibers, which fibers are bonded to one another at points of contact, the improvement of a pH control medium adhered to the fibers, said pH control medium comprising a hardened alkyd resin carrier material and, dispersed therein, an alkali neutralizing agent, said carrier being soluble in water to an extent sufficient to release the neutralizing agent at a rate which is at least substantially as high as that required to neutralize alkali leached from the vitreous fibers, but insoluble to an extent such that at least an appreciable amount thereof remains after the article has been subjected to boiling water for one hour.

References Cited in the file of this patent

UNITED STATES PATENTS

| | | |
|---|---|---|
| 2,331,944 | Pazsiczky | Oct. 19, 1943 |
| 2,407,483 | Ebaugh | Sept. 10, 1946 |
| 2,444,347 | Greger | June 29, 1948 |